United States Patent [19]

Sorensen

[11] 4,193,628
[45] Mar. 18, 1980

[54] BAYONET STRUCTURE FOR DETACHABLE SUNROOF

[75] Inventor: Norman L. Sorensen, Detroit, Mich.

[73] Assignee: Wisco Corporation, Ferndale, Mich.

[21] Appl. No.: 909,386

[22] Filed: May 25, 1978

Related U.S. Application Data

[63] Continuation-in-part of Ser. No. 820,105, Jul. 29, 1977.

[51] Int. Cl.² ............................................. B60J 7/08
[52] U.S. Cl. ................................... 296/137 B; 49/465
[58] Field of Search ............. 296/137 B; 16/171, 172, 16/174; 49/465, 261, 394

[56] References Cited

U.S. PATENT DOCUMENTS

| 3,955,848 | 5/1976 | Lutz et al. ........................ 296/137 B |
| 3,974,753 | 8/1976 | Blomgren et al. ................ 296/137 B |
| 4,005,901 | 2/1977 | Lutke et al. ...................... 296/137 B |
| 4,067,605 | 1/1978 | Green et al. ..................... 296/137 B |
| 4,118,063 | 10/1978 | Bienert et al. .................... 296/137 B |

*Primary Examiner*—Robert R. Song
*Attorney, Agent, or Firm*—Basile and Weintraub

[57] ABSTRACT

A frame extending around an opening in a vehicle roof has a resilient molding adapted to support the perimeter of a curved glass panel to close off the opening. A pair of bayonets projecting in spaced relationship to the underside of the forward edge of the panel mates with a recessed member carried by the frame when the panel is inclined with respect to the roof to act as a pivotal hinge, allowing motion of the panel between a closed position and that inclined position. The bayonets include cantilevered beams which are provided with reinforcing flanges disposed intermediate the main body of the bayonets and the top of the cantilevered beams. In a second embodiment of the invention, the bayonet body and the cantilevered beam have a metal insert which provides additional strength and flexibility.

6 Claims, 8 Drawing Figures

BAYONET STRUCTURE FOR DETACHABLE SUNROOF

CROSS REFERENCE TO RELATED APPLICATIONS

This application is a continuation-in-part application of copending U.S. patent application Ser. No. 820,105, filed July 29, 1977, and entitled "Sunroof Structure."

BACKGROUND OF THE INVENTION

I. Field of the Invention

The present invention relates to a removable sunroof panel for a vehicle roof and, more particularly, to an improvement in a bayonet design which is used for supporting the panel in one of a plurality of operative relationships with respect to the roof.

II. Prior Art

The above-referenced application discloses an opening in a vehicle roof adapted to receive a removable, transparent sunroof panel. The panel is retained in a framed opening by a pair of bayonets which project from the underside of the panel on the forward edge and cooperate with the adjacent panel edge to engage the frame. A fastener for the rear edge of the panel includes a handle, pivotally connected to the underside of the panel, and a tongue, pivotally connected to the handle and adapted to be retained in a lock member in the frame. The handle acts as an over-center linkage to bend the panel against its curvature, forcing its perimeter into engagement with the frame, or may be extended to maintain the panel with its rear edge tilted away from the opening.

U.S. Pat. No. 4,067,605 discloses a similar sunroof structure.

Other sunroof structures, such as disclosed in U.S. Pat. No. 2,215,022, employ panels supported for a sliding motion between a closed position, covering an opening in the vehicle roof, and an open position in which they are supported in a compartment affixed to the underside of the vehicle roof, behind the opening.

Other examples of sunroof structures are disclosed in U.S. Pat. Nos. 3,913,971; 3,955,848; and 3,537,212; and West German Patentenmeldung No. V7038V/68b. These patents are relevant in that they were cited by applicant in the aforementioned patent aplication.

III. Prior Art Statement

The prior art listed hereinbefore includes, in the opinion of the applicant, the closest art of which applicant is aware.

SUMMARY OF THE INVENTION

The present invention, which will be described subsequently in greater detail hereinafter, is broadly directed toward an improvement in an apparatus for retaining a removable panel within a sunroof opening which allows the panel to either close off the opening or to be supported with its rear edge tilted upwardly, away from the rear edge of the opening, so that the panel is inclined with respect to the plane of the roof.

As will be described hereinafter in greater detail in the following description of several examples of the preferred embodiments of the invention, the apparatus includes a frame extending around the perimeter of the opening. The frame has a resilient molding which functions as a supporting surface, substantially in the plane of the roof, for retaining the edge of the panel. A pair of recessed members are carried by the frame, below the supporting surface, at spaced points along the forward end of the opening, and are adapted to receive a pair of mating bayonets affixed to the underside of the forward edge of the panel.

A fastener, which separably joins the rear end of the panel to the rear end of the frame, includes a push-button release lock member affixed to the underside of the frame. The latch handle for the fastener is pivotally connected to a hinge which is, in turn, pivotally supported on the underside of the rear end of the panel. A tongue adapted to be retained in the lock member and released by a push-button assembly is also pivotally attached to the handle. The handle, the hinge and the tongue form a linkage which may be disposed in either a closed position, wherein the handle lies adjacent the underside of the frame and pulls the panel down against the frame, or in an extended position, wherein the handle projects upwardly from the frame and supports the rear end of the panel above the frame so that the panel is inclined with respect to the frame in a ventilating position. A detent mechanism carried by the handle maintains the handle in the opened position. To remove the panel, the push button is depressed, releasing the tongue from the lock member, and the panel is pivoted about the forward end to a position wherein the bayonets may be removed from the forward frame opening. The lock member includes a recessed portion which is provided with a rib arrangement that prevents the inadvertent opening of the lock member when the handle is first snapped into the closed position. The handle has a detent release mechanism which automatically releases the detent when the handle is moved to a closed position.

The bayonets are constructed to hold the forward edge of the panel securely in place when the panel is in the partially opened position and when it is closed. The bayonets are released from the frame's forward edge when the panel has been rotated about 30°. These functions of the bayonets place considerable strain on their cantilever beams which extend from the bayonet body to engage the frame. Vertical reinforcing flanges along the edges of the cantilever beam serve to stiffen the beam. However, the reinforcing flanges may not extend to the body of the bayonet or too much stress will be carried by the narrow end of the cantilever beam, causing it to fracture at that point. Ending the reinforcing flanges short of the bayonet body allows the bending stress to be carried over the strongest part of the cantilever beam, preventing the aforementioned fracture. In a second embodiment, each bayonet has internal metal members which provide additional strength and flexibility.

It is therefore an object of the present invention to provide a new and improved sunroof structure which is relatively simple in construction, yet one which is of low cost and is reliable in operation.

It is a further object of the present invention to provide a new and improved bayonet construction for such sunroof structures.

Other objects, advantages and applications of the present invention will become apparent to those skilled in the art of sunroof structures when the accompanying description of several examples of the best modes for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENTS

Figure 1:
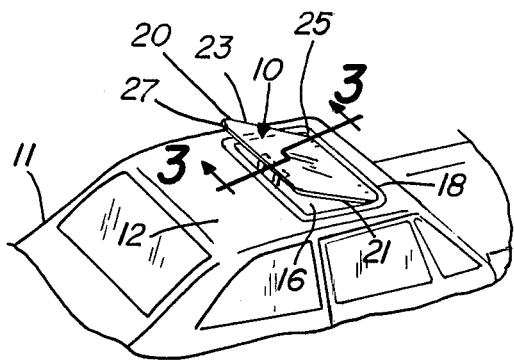
FIG. 1 is a fragmentary, perspective view of an automobile incorporating a sunroof formed in accordance with the principles of the present invention, with the panel shown in a tilted ventilating position.
Figure 4:
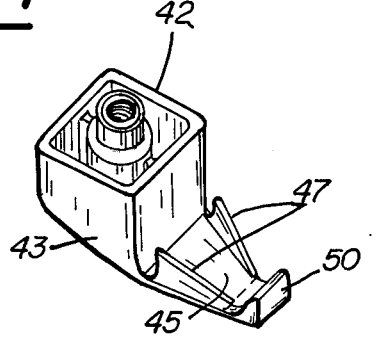
FIG. 4 is a perspective view of one example of a bayonet showing how the stiffening flanges along the cantilever beams' edges are spaced apart from the body of the bayonet.

Referring now to the drawings and, in particular, to FIG. 1 for one example of the present invention in the form of a sunroof 10 carried by an automobile 11, although it is equally applicable to trucks, vans, recreational vehicles and the like.

The roof of the automobile 11 is typically formed from an outer sheet metal skin 12 and a fabric headliner 14 (FIGS. 2 and 3), disposed under the roof skin 12 and spaced therefrom. In accordance with the present invention, a sunroof opening is formed in the roof, usually over the front seat of the automobile 11, and the perimeter of this opening is finished with a frame 18. The frame 18 is adapted to removably secure a panel 20, preferably formed of a sheet of shatterproof, tinted glass and having dimensions complementary to the frame opening 16.

The panel 20 is formed with a gradual curvature across its width so that its concave side faces the frame 18. Accordingly, the two side edges 21 and 23 are straight, and the forward edge 25 and rear edge 27 are bowed away from the frame 18. The frame 18 may be level across its width or may have a slight crown, but its curvature should be less than that of the panel 20 so that when the forward edge 25 of the panel 20 is first lowered into position against the frame 18, the panel's front edge 25 abuts the forward edge of the frame 18 and the center of the rear edge 27 is raised with respect to the frame 18. In the preferred embodiment of the invention the curvatures of the panel 20 and the frame 18 are such that the center of the rear edge 27 of the panel 20 is separated from the frame 18 by about ⅜ of an inch in this position.

The frame 18 may be formed of a one-piece molded construction, adapted to fit the roof opening. The frame 18 includes an extending section 22 which overlies the top of the roof 12 at the aperture. A downwardly extending section 24 of the molding has a surface 26 inclined inwardly under the extending section 22 to form a pair of opposed, tapered surfaces adapted to receive tapered wedges 28 which abut the underside of the perimeter of the roof 12 to lock the frame to the roof. The wedges 28 extend along substantial portions of the interface between the frame 18 and the roof 12. The wedges 28 are fixed to the frame 18 by threaded fasteners 30. The downwardly extending section 24 of the frame contains a downwardly opening groove 32 adapted to receive a plastic molding 34 which, in turn, conceals the edge 35 of the fabric headliner 14. The headliner 14 stops short of the groove 32 and is attached to the underside of the section 24 by any suitable means, such as an adhesive.

The frame 18 also includes a section 36, cantilevered into the opening 16 in the plane of the roof and retaining a resilient molding 38 on its upper surface.

The resilient molding 38 comprises an elongated tubular section 39 having a base portion 41 which is seated on the upper surface of the frame cantilevered section 36. The tubular section 39 has upwardly and outwardly inclined, integral side walls 95 and 97 which are joined at their upper extremities by top portion 49 to define thereinbetween an air cavity. The base portion 41 has an inclined, integrally formed flange portion 53 which extends upwardly to approximately the same height as the tubular section 39. The outside surface 57 of the upright flange portion 53 is seated on the inclined wall 59 of the frame 18. The abutting surfaces of the molding 38 and frame 18 are secured to one another by any suitable means, such as an adhesive. The opposing surfaces of the tubular section 39 and the upright flange portion 53 are laterally spaced from each other and define a longitudinal space 55, for a purpose to be described hereinafter. The upper surface of the top portion 49 has a plurality of laterally spaced, longitudinally disposed ridges 61 which are adapted to receive and support the underside of the perimeter of the panel 20. When the panel 20 is in the closed position illustrated in FIG. 3 (and as will be described hereinafter), the tubular section 39 is compressed; however, due to the longitudinal space 55, the constant expansion and compression of the tubular section 39 does not exert any forces onto the flange portion 53 and, thus, assures that the flange portion 53 will not prematurely separate from the flange wall 59. In the preferred embodiment the molding 38 is made from a closed cell, neoprene sponge material.

Figure 3:
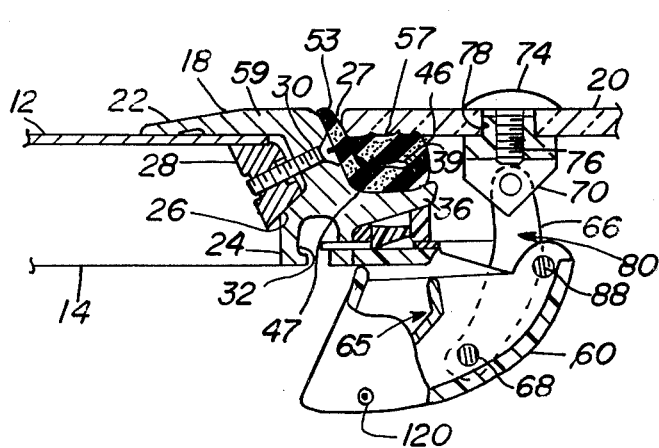
FIG. 3 is a sectional view through the sunroof panel and vehicle roof, taken along line 3—3 of FIG. 1, showing the front and rear attachments between the panel and the roof frame when the panel is in its closed position, with the intermediate section of the panel broken away.

As can best be seen in FIG. 3, at two spaced points along the forward edge of the opening 16, bayonet support members 40 are attached to the lower side of the frame cantilevered section 36. The support members 40 are shaped to cooperate with the frame 18 so as to define a pair of recesses 63 which are adapted to cooperate with a pair of extending bayonet members 42 affixed to the underside of the panel 20 at two spaced points on its forward edge. The bayonets are secured to the panel by bolts 44, extending through holes 46 formed in the panel 20 and mating with internally threaded bosses 48 formed on the upper surface of the bayonets 42, which fit into the holes 46. The bayonets 42 have between their end sections 50 and their body 43 a cantilever beam 45 connecting the body 43 to the end sections 50. The cantilever beam 45 has disposed along its edges reinforcing flanges 47. Reinforcing flanges 47 have their maximum height near body 43, taper downwardly near end sections 50 and are spaced apart from body 43.

The bayonets project toward the edge of the panel 20 at a slight, downwardly inclined angle away from the panel and have upward, right-angled, bent, extreme end sections 50. These ends are received by the support member recesses 63 or are removable from the support member recesses 63 when the forward edge of the panel 20 are supported against the section of the resilient molding 38 above the slots, and the panel is inclined with respect to the roof 12 at an angle of about 30°. When the panel is then rotated into closer alignment with the roof, the upper edge of the bayonet section 50 presses against the lower edge of the bayonet support member 40 and pulls the underside of the panel edge against the resilient molding 38. At these lower angles the extending section 50 cannot be removed from the recesses 63, and the two act as a hinge to allow pivoting motion of the panel 20 relative to the roof 12.

When the perimeter of the panel 20 is in abutment with the resilient molding 38 all the way around the perimeter of the opening 16, the engagement of the bayonet section 50 and the support member recesses 63 forces the edge of the panel into pressured engagement with the resilient section, as shown in FIG. 3. To insert the panel 20 into engagement with the roof 12 or to remove the panel 20 from the roof 12, the panel 20 is inclined to a sufficient angle and the two sections 50 of the bayonets 42 are removed from the frame recesses 63.

Figure 2:
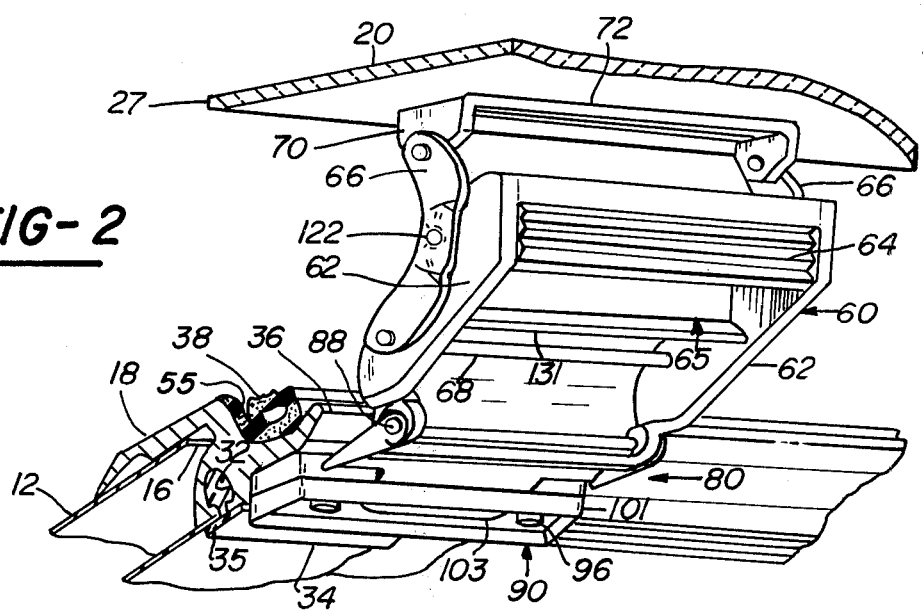
FIG. 2 is a partially sectioned, perspective view of the latch mechanism attached to the rear end of the panel and the associated locking mechanism attached to the frame, with the handle detent mechanism in an engaged position.

Referring now to FIGS. 2 and 3, it can be seen that the rear edge of the panel 20 is fastened to the frame 18 by means of a two-part, separable fastener centered about a latch handle member 60. The handle is a flat, thin, curved, injection molded section having a pair of side flanges 62 and an end section 64 which extends transversely to the flanges and to the handle section 60. The handle member 60 includes a detent release mechanism 65, which will be described hereinafter.

A pair of flat, slightly arcuate, stamped hinges 66 is pivotally connected to the opposite sides of the latch handle 60 at one of their ends by a pivot pin 68, journaled in holes in the two handle flanges 62 so that the hinge ends extend slightly beyond the flanges. The ends of the pin pass through holes formed in the hinges 66 and are peened. The other ends of the hinges 66 are pivotally supported on two ears 70 which extend downwardly from the ends of a flat, molded plastic, glass mount 72. The mount 72 is secured to the underside of the panel 20, midway along the rear edge of the panel 20 and slightly inward from the edge, by a pair of bolts 74 (FIG. 3) which mate with internally threaded cylindrical bosses 76 extending upwardly from the mount 72 and passing through holes 78 in the panel.

The latch handle 60 also pivotally supports a flat, sheet metal, extending tongue 80. The tongue has a central catch aperture and a pair of ears which are bent normally to the main tongue surface and have holes formed centrally therein. The tongue is pivotally connected to the end of the latch handle 60, opposite to the flange 64, by a pivot pin 88 which extends between the latch handle flanges 62 and has its ends projecting slightly beyond these flanges. The ends of the pin pass through the holes of the tongue and are retained by snap rings or the like.

The tongue 80 is adapted to be inserted and retained within a releasable lock mechanism fixed to the underside of the frame 18 at the center of the rear of the opening 16.

The lock includes an elongated retainer member having an inclined catch, projecting from the bottom of its underside and having a pair of downwardly extending push buttons 96 extending from its end. The push buttons project through holes formed in the bottom plate 100.

A more detailed description of the releasable lock mechanism can be found in the aforementioned patent application Ser. No. 820,105.

To remove the panel 20, the latch is moved to a position between closed and vent. The push buttons 96 are then pressed upwardly, releasing the tongue, and the tongue is released from the lock. The panel is then pushed upwardly at its rear end, and the extending sections 50 of bayonets 42 are removed from the bayonet recesses 63, releasing the panel.

Referring now to FIGS. 5 through 8 for an aid in understanding the following description, there is illustrated a second embodiment of the present invention in the form of a bayonet 102. The bayonet 102 is interchangeable with the bayonet 42, and the operation and application of the bayonet 42 as hereinbefore described is equally applicable to the bayonet 102.

Figure 5:
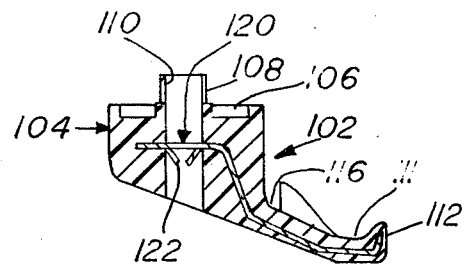
FIG. 5 is a longitudinal, sectional view through a second example of a bayonet incorporating the present invention and taken along line 5—5 of FIG. 6.
Figure 6:
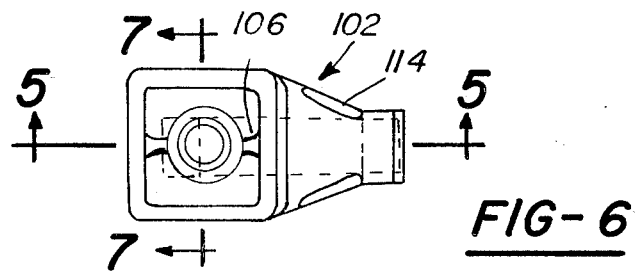
FIG. 6 is a top plan view of FIG. 5.
Figure 7:
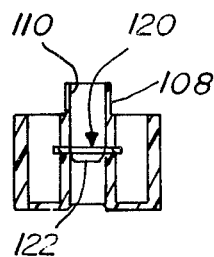
FIG. 7 is a cross-sectional view of the bayonet taken along line 7—7 of FIG. 6.

As can best be seen in FIG. 5, the bayonet 102 comprises a body 104 having a hollow interior enclosed by the rectangularly shaped walls of the body 104. The midsection of the body 104 has a central partition 106 which, in turn, includes an upright boss 108 having a through bore 110 that extends completely through the body 104. The body 104 has an integral cantilever beam 111 that extends laterally from the body 104 and terminates in an upright, bent end section 112. The cantilever beam 111 has laterally spaced reinforcing flanges 114 located intermediate the body 104 and the end section 112 to define a slot 116 between the body 104 and the reinforcing flanges 114. The slot 116 functions to insure that the cantilever beam 111 is sufficiently flexible.

Figure 8:
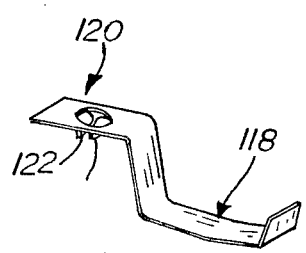
FIG. 8 is a perspective view of the metal insert used in the bayonet of FIGS. 5 through 7.

The bayonet 102 is molded with an internal metal insert 118 which, as can best be seen in FIG. 8, is a flexible part of steel having a contour following the cantilever beam 111 and the end section 112. The insert 118 has an apertured section 120 which includes a pair of flanges 122 that are aligned with the bore 110 of the boss 108. Thus, when a threaded fastener 44 is inserted through the panel 20 and is received in the bore 110, the fastener will threadingly engage the metal insert 118. The metal insert 118 provides substantial strength to the bayonet 102 while providing additional flexibility to the cantilever beam 111.

While only two examples of the present invention have been disclosed, it should be understood by those skilled in the art of sunroofs that other forms of applicant's invention may be had without departing from the spirit of the invention or scope of the appended claims.

What is claimed is as follows:

1. A removable, transparent panel for the roof of a vehicle, said panel having a hinged edge and an opening edge;

said opening edge having a separable fastener for joining said opening edge of said panel to a section of a frame extending about an opening in said roof;

said separable fastener having a handle member supported to the underside of the panel adjacent an edge thereof, said handle member being adapted for motion between a first position, wherein said opening edge of said panel adjacent to said handle member is forced into engagement with said frame, and the second position, wherein said opening edge is spaced with respect to said frame, said handle member being separable from said frame;

said hinged edge having bayonets which are attached to said hinged edge at one end, while the other ends of said bayonets pivot against a recessed section on said frame;

each of said bayonets having at said other ends an upright projection cooperating with said recessed section to hold each bayonet in hinged contact with said frame for a predetermined amount of rotation; and said one end and said other end of said bayonets being connected by a bottom wall, said bottom wall being reinforced along each edge by a pair of upright walls, said upright walls having a maximum height near said one end and tapering toward said other end, said upright walls being spaced apart from said one end.

2. The panel is defined in claim 1 wherein said bayonets are made from injection molded plastic.

3. The panel as defined in claim 1 wherein said bayonets are made from die cast metal.

4. The panel defined in claim 1 further comprising a metal insert in each of said bayonets.

5. The removable, transparent panel defined in claim 1 wherein each of said bayonets comprises a body having side walls, a bottom and a top, said top having a circular post projecting vertically from its center, said circular post having a bore, a cantilever beam projecting outwardly and downwardly from the bottom edge of one of said side walls, the outer end of said cantilever beam having a bent, upright end that defines said upright projection, said upright walls being vertical stiffening walls disposed along both edges of said cantilever beam, said stiffening walls being spaced apart from said upright end, said stiffening walls being spaced from said body.

6. The removable, transparent panel defined in claim 5 further comprising a metal insert in each of said bayonets.

* * * * *